June 4, 1963 T. LODE 3,092,739
DRY CIRCUIT SWITCHING MEANS
Filed Nov. 13, 1959 2 Sheets-Sheet 1
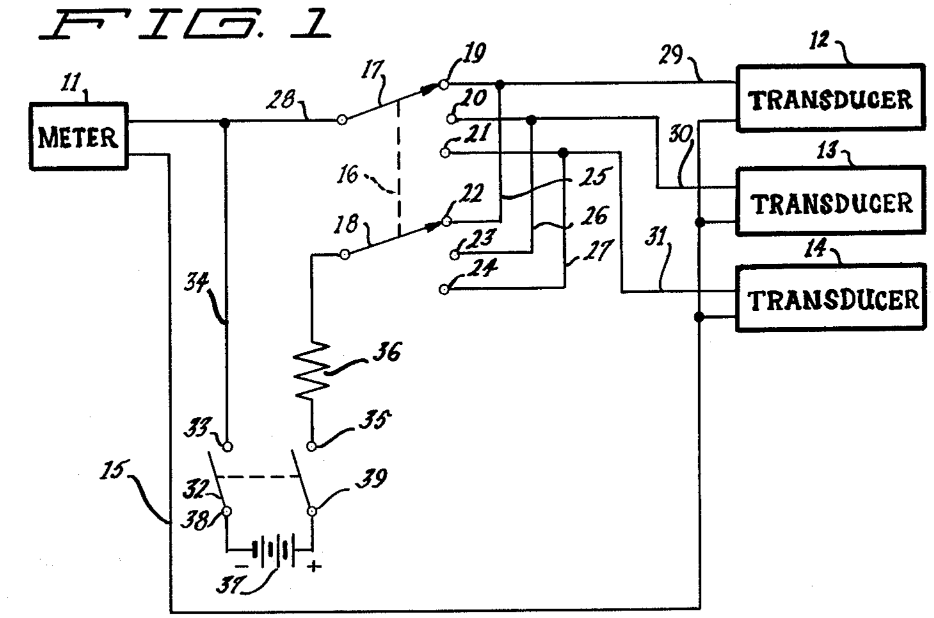
FIG. 2
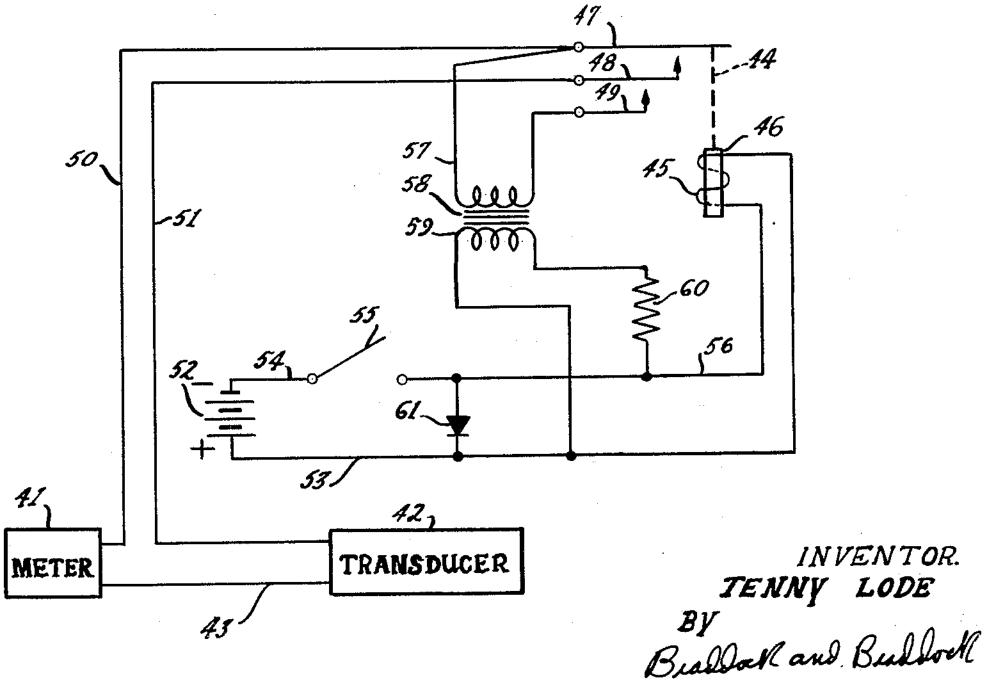
INVENTOR.
TENNY LODE
BY
Buckhorn and Buckhorn
ATTORNEYS INVENTOR.
TENNY LODE
BY Braddock and Braddock
ATTORNEYS United States Patent Office 3,092,739
Patented June 4, 1963

3,092,739
DRY CIRCUIT SWITCHING MEANS

Tenny Lode, Minneapolis, Minn., assignor to Rosemount Engineering Company, Minneapolis, Minn., a corporation of Minnesota Filed Nov. 13, 1959, Ser. No. 852,869
7 Claims. (Cl. 307—137)

This invention relates to the switching of electrical circuits. More particularly, it relates to the switching of circuits carrying low voltages and/or currents.

The switching of low voltage and/or current electrical circuits is frequently referred to as dry circuit switching. In the absence of an exact and generally accepted definition of a dry circuit, it may be described as a circuit in which the open circuit voltage is of the order of one volt, or less, or the closed circuit current of the order of one tenth ampere, or less. Dry circuit switching has become increasingly important in computing, control, telemetering, instrumentation, and numerous other applications.

The problem in dry circuit switching is that a relay, or other switching device, may make a poor electrical connection even though its contacts are mechanically closed. This difficulty is usually of an intermittent and random nature, and generally becomes worse as the circuit voltage and/or current level decreases. It is believed that the dry circuit switching problem is due to low conductivity thin films which are formed on the contact surfaces. Moderate voltages and currents burn through or otherwise remove these thin films, and establish a low resistance path between the switch contacts. In dry circuits, the circuit voltage and/or current is inadequate to remove the surface films and a poor electrical connection may result. Progress has been made in the successful switching of dry circuits through the use of precious metal contacts, wiping actions, hermetically sealed contact assemblies, and mercury wetted contacts. However, particularly in instances where the open circuit voltage is of the order of a few millivolts or less, present techniques for dry circuit switching have not proven entirely satisfactory.

An object of this invention is to allow the reliable low resistance switching of dry circuits. Other objects and advantages may be seen by reference to the drawings and the specification.

A particular form of the present invention may employ an electromagnetic relay with three sequentially closing, normally open contacts. The relay is constructed so that a first connection from a first contact to a second contact is made before and broken after a second connection is made or broken from the second contact to a third contact. The first and second contacts are employed to switch the low voltage and/or current circuit. A battery, or other electrical energy source, and a current limiting resistance are connected in series from the first contact to the third contact. When the relay is energized, a current flows in a circular loop through the battery and series resistance, the conducting path from the third contact to the second, and the conducting path from the second contact to the first. This circulating current assures the formation of a low resistance conducting path between the first and second contacts. Hence, a low resistance connection is assured in the low voltage and/or current circuit. The sequential closing of the contacts prevents the battery voltage from being fed directly into the low voltage and/or current circuit.

In the drawings:

FIGURE 1 is a schematic illustration of a first form of the invention;

FIGURE 2 is a schematic illustration of a second form of the invention;

Figure 3:
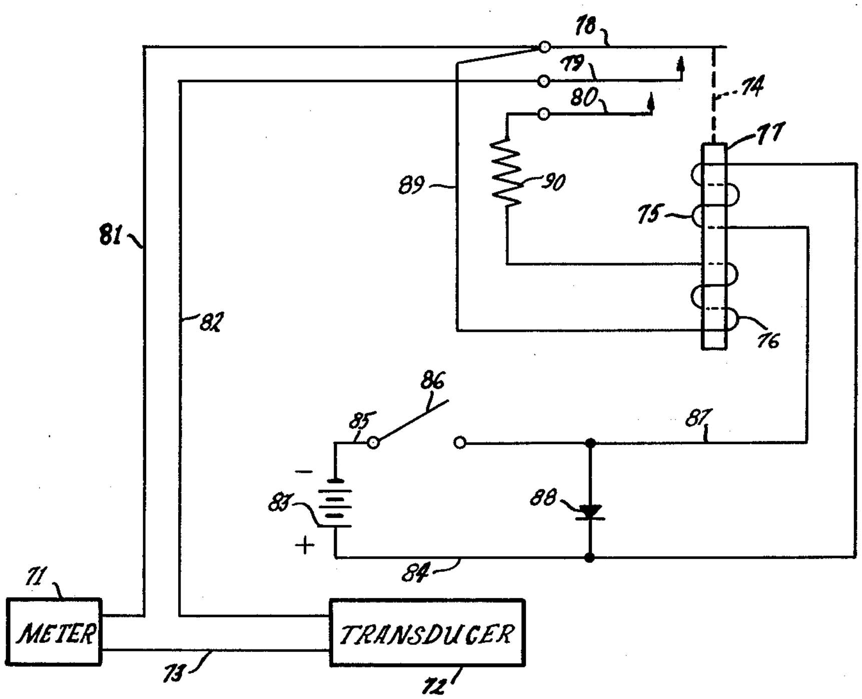
FIGURE 3 is a schematic illustration of a third form of the invention.

Referring to the drawings, FIGURE 1 illustrates a first form of the invention. In FIGURE 1, a first side of each of instruments 11, 12, 13 and 14 connects to common line 15, which serves as a ground or reference line. Multiple position switch 16 includes mechanically joined wipers 17 and 18. In a first position of switch 16, as shown in FIGURE 1, wiper 17 connects to terminal 19, and wiper 18 connects to terminal 22. In a second position of switch 16, wiper 17 connects to contact 20 and wiper 18 connects to contact 23. Similarly, in a third position of switch 16, wiper 17 connects to contact 21 and wiper 18 connects to contact 24. Terminals 19, 20, and 21 connect to the second side of instruments 12, 13, and 14 respectively through lines 29, 30, and 31 respectively. Terminal 22 connects through lines 25 and 29 to terminal 19. Similarly, terminal 23 connects through lines 26 and 30 to terminal 20, and terminal 24 connects through lines 27 and 31 to terminal 21. The second side of instrument 11 connects through line 28 to wiper 17 of switch 16. Terminal 33 of double pole single throw switch 32 connects through line 34 to line 28. Terminal 35 of switch 32 connects through resistor 36 to wiper 18. Battery 37 is connected across terminals 38 and 39 of switch 32.

It is assumed that it is desired to connect the second side of instrument 11 to the second side of a selected one of instruments 12, 13, or 14. This connection is made through line 28 and wiper 17. The selection of instrument 12, 13, or 14 is determined by the setting of switch 16. The currents flowing between instruments 11 and the instrument selected by switch 16 are assumed to be of low voltage and/or current. For example, in the circuit as shown, instruments 12, 13, and 14 may be transducers converting temperature, pressure, or other quantities, into low level electrical signals, and instrument 11 a sensitive voltage or current measuring device employed to measure the transducer outputs. Because of the dry circuit switching problem previously discussed, switch 16 alone may fail to provide a low resistance electrical path for low voltages and/or currents.

To assure the establishment of a low resistance electrical path from line 28 through wiper 17 to the selected instrument, switch 32 is closed after the positioning of switch 16. In the example of FIGURE 1, switch 16 is positioned to select instrument 12. The closing of switch 32 causes a current to flow in the circular loop from battery 37 through terminals 38 and 33 of switch 32, lines 34 and 28, wiper 17, contact 19, lines 29 and 25, contact 22, wiper 18, resistor 36, and terminals 35 and 39 of switch 32 back to battery 37. This circulating current breaks down the surface films on the contacts of wiper 17 and terminal 19 or otherwise establishes a low resistance electrical path from line 28 through wiper 17 and contact 19 to line 29 and the second side of instrument 12. If switch 16 were positioned to select instrument 13, wiper 17 would connect to contact 20 and wiper 18 would connect to contact 23. Then, the closing of switch 32 would cause a current to flow in a circular loop from battery 37 through switch 32, lines 34 and 28, wiper 17, contact 20, lines 30 and 26, contact 23, wiper 18, resistor 36 and switch 32 back to battery 37. This circulating current would establish a low resistance electrical path from line 28 through wiper 17 and contact 20 to the second side of instrument 13. Similarly, if switch 16 were positioned to select instrument 14, wiper 17 would connect to contact 21 and wiper 18 would connect to contact 24. The closing of switch 32 would then cause a circulating current to flow in a circular loop from battery 37 through switch 32, lines 34 and 28, wiper 17, contact 21, lines 31 and 27, wiper 18, resistor 36 and switch 32 back to battery 37. This circulating current would establish a low resistance electrical path from line 28 through wiper 17 and contact 21 to the second side of instrument 14.

The magnitude of the circulating current is limited by resistance 36 to limit tht magnitude of the resistive voltage drop across switch 16 due to the circulating current, and to prevent damage to the contacts of switch 16. If desired, switch 32 may be opened to interrupt the circulating current once a low resistance electrical path has been established through switch 16. To prevent the voltage of battery 37 from appearing across the open contacts of switch 16 and in the instrument circuit, switch 32 should be opened before and closed after the manipulation of switch 16.

FIGURE 2 illustrates a second form of the invention. In FIGURE 2, a first side of each of instruments 41 and 42 is connected to common line 43, which serves as a ground or reference line. Relay 44 includes coil 45 wound upon core 46 and sequentially closing, normally open, contacts 47, 48, and 49. Line 50 connects the second side of instrument 41 to contact 47, and lines 51 connects contact 48 to the second side of instrument 42. The positive side of battery 52 connects through line 53 to a first side of coil 45. The negative side of battery 52 connects through line 54 to a first side of switch 55. The second side of switch 55 connects through line 56 to the second side of coil 45. Secondary winding 57 of transformer 58 connects across contacts 47 and 49. A first side of primary winding 59 of transformer 58 connects to line 53, and the second side connects through resistor 60 to line 56. The anode of diode 61 connects to line 56 and the cathode to line 53.

In the circuit of FIGURE 2, relay 44 performs the functions of switches 16 and 32 of FIGURE 1. The contacts of relay 44 are sequentially closing. When coil 45 of relay 44 is energized, contact 47 moves toward contact 48 forming a first electrical connection thereto, whereupon contacts 47 and 48 move together towards contact 49 forming a second electrical connection between contacts 48 and 49. Thus, a connection between contacts 47 and 48 is made before and broken after the making and breaking of a connection between contacts 48 and 49.

When switch 55 is open, contacts 47, 48, and 49 remain open and the connection of instruments 41 and 42 is incomplete. When switch 55 is closed, current from battery 52 flows through lines 56 and 53 and coil 45 of relay 44. This current energizes coil 45 and initiates the closing of the contacts of relay 44. Current from battery 52 also flows from line 56 through resistor 60 and primary winding 59 to line 53. The current through primary winding 59 induces a voltage across secondary winding 57 and across contacts 47 and 49. However, this induced voltage cannot cause a significant current flow through secondary winding 57 so long as the connection between contacts 48 and 49 remains open. As the contacts of relay 44 close, the making of a first electrical connection between contacts 47 and 48 connects instrument 41 to instrument 42 through lines 50 and 51. Subsequently, when the second electrical connection is made between contacts 48 and 49, a circulating current will flow through secondary winding 57, contact 49, the electrical connection between contacts 48 and 49, the electrical connection between contacts 47 and 48, and contact 47 back to secondary winding 57. This circulating current assures the establishment of a low resistance electrical path between contacts 47 and 48. Hence, a low resistance conducting path is established for low voltages and/or currents which may be transmitted between instruments 41 and 42 through lines 50 and 51. The magnitude of the currents circulating through secondary winding 57 is limited by resistor 60 in the primary circuit of transformer 58, to limit the resistive voltage drop across contacts 47 and 48 due to the circulating current, and to prevent damage to contacts 47, 48, or 49. As switch 55 remains closed, transformer 58 becomes magnetically saturated and the circulating current through secondary winding 57, and any voltage drop induced thereby, approaches zero.

When switch 55 is opened, coil 45 and primary winding 59 are de-energized. Diode 61 prevents the inductance of coil 45 and/or primary winding 59 from generating a reverse voltage across lines 56 and 53. As the contacts of relay 44 open, the connection between contacts 48 and 49 is broken first to prevent current circulating through winding 57 from directly entering the circuits of instruments 41 and 42. Thereafter, the connection between contacts 47 and 48 is broken, opening the connection between instruments 41 and 42 through lines 50 and 51.

FIGURE 3 illustrates a third form of the invention. In FIGURE 3, a first side of each of instruments 71 and 72 is connected to common line 73 which serves as a ground or reference line. Relay 74 includes coils 75 and 76 wound upon core 77 and sequentially closing, normally open contacts 78, 79, and 80. Line 81 connects the second side of instrument 71 to contact 78, and line 82 connects contact 79 to the second side of instrument 72. The positive side of battery 83 connects through line 84 to a first side of coil 75. The negative side of battery 83 connects through lines 85 to a first side of switch 86. The second side of switch 86 connects through line 87 to the second side of coil 75. The anode of diode 88 connects to line 87 and the cathode to line 84. Line 89 connects from a first side of coil 76 to terminal 78, and resistor 90 connects from the second side of coil 76 to terminal 80.

The operation of the circuit of FIGURE 3 closely resembles that of the circuit of FIGURE 2. The essential difference is the replacement of transformer 58 by coil 76 wound upon relay core 77.

When switch 86 is open, contacts 78, 79, and 80 remain open and the connection of instruments 71 and 72 is incomplete. When switch 86 is closed, current from battery 83 flows through lines 84 and 87 and coil 75 of relay 74. This current energizes coil 75 and initiates the closing of contacts 78, 79, and 80. The changing magnetic flux through core 77 induces a voltage across coil 76. However, this induced voltage cannot cause a significant current flow through coil 76 as long as the connection between contacts 79 and 80 remains open. As the contacts of relay 74 close, the making of the first connection between contacts 78 and 79 connects instruments 71 and 72 through lines 81 and 82. Subsequently, when the second electrical connection is made between contacts 79 and 80, a circulating current will flow from coil 76 through resistor 90, contact 80, the electrical connection between contacts 79 and 80, the electrical connection between contacts 78 and 79, contact 78, and line 89 back to coil 76. This circulating current assures the establishment of a low resistance electrical path between contacts 78 and 79. Hence, a low resistanct conducting path is established for low voltages and/or currents which may be transmitted between instruments 71 and 72 through lines 81 and 82. The magnitude of the current circulating through coil 76 is limited by resistor 90, to limit the resistive voltage drop across contacts 78 and 79 due to the circulating current, and to prevent damage to contacts 78, 79, or 80. As switch 86 remains closed, the magnetic flux intensity through core 77 approaches a limiting value and the circulating current through coil 76, and any voltage drop induced thereby, approaches zero.

When switch 86 is opened, coil 75 is de-energized. Diode 88 prevents the inductance of coil 77 from generating a reverse voltage across lines 84 and 87. As the contacts of relay 74 open, the connection between contacts 79 and 80 is broken first to prevent the current circulating through coil 76 from directly entering the circuit of instruments 71 and 72. Thereafter, the connection between contacts 78 and 79 is broken, opening the connection between instruments 71 and 72 through lines 81 and 82.

Figure 4:
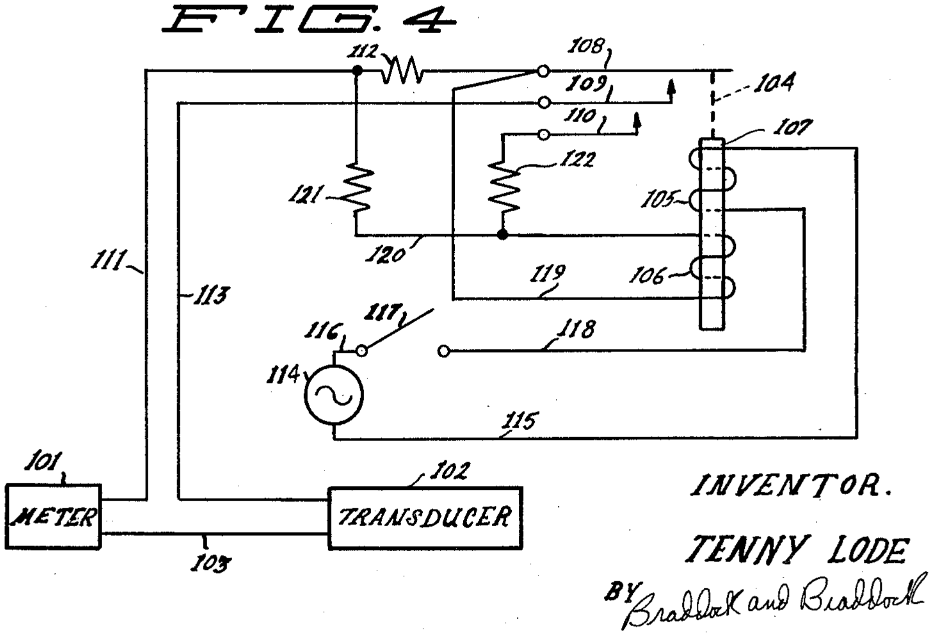
FIGURE 4 is a schematic illustration of a fourth form of the invention.

FIGURE 4 illustrates a fourth form of the invention. In FIGURE 4, a first side of each of instruments 101 and 102 is connected to common line 103, which serves as a ground or reference line. Relay 104 includes coils 105 and 106 wound upon common core 107, and sequentially closing, normally open contacts 108, 109, and 110. Line 111 connects a second side of instrument 101 to a first side of resistor 112. The second side of resistor 112 connects to contact 108. Line 113 connects from contact 109 to the second side of instrument 102. A first side of A.C. voltage source 114 connects through line 115 to a first side of coil 105. The second side of A.C. voltage source 114 connects through line 116 to a first side of switch 117. The second side of switch 117 connects through line 118 to the second side of coil 105. A first side of coil 106 connects through line 119 to contact 108. The second side of coil 106 connects through line 120 to a first side of resistor 121 and to a first side of resistor 122. The second side of resistor 121 connects to line 111, and the second side of resistor 122 connects to contact 110.

The operation of the circuit of FIGURE 4 closely resembles that of the circuit of FIGURE 3. The essential difference is the energizing of relay 104 with alternating current, and the use of a resistor network to reduce the magnitude of the voltage generated across lines 111 and 113 by current circulated through coil 106 and the contacts of relay 104.

When switch 117 is open, contacts 108, 109, and 110 remain open and the connection of instruments 101 and 102 is incomplete. When switch 117 is closed, current from alternating voltage source 114 flows through lines 115 and 118 and coil 107 of relay 104. This current energizes coil 107 and initiates the closing of contacts 108, 109, and 110. As the contacts of relay 104 close, the making of the first connection between contacts 108 and 109 connects instruments 101 and 102 through lines 111 and 113 and resistor 112. The alternating magnetic flux through core 107 induces an alternating voltage across coil 106. This induced voltage causes a first circulating alternating current to flow in the circular loop from coil 106 through line 119 to contact 108, through resistor 112 to line 111, and through resistor 121 and line 120 back to coil 106. The induced voltage across coil 106 cannot cause a significant current flow through resistor 122 as long as the connection between contacts 109 and 110 remains open. Subsequently, when the second electrical connection is made between contacts 109 and 110, a second circulating alternating current will flow in the circular loop from coil 106 through line 119, contact 108, the electrical connection between contacts 108 and 109, the electrical connection between contacts 109 and 110, contact 110, resistor 122, and line 120 back to coil 106. This second circulating current assures the establishment of a low resistance electrical path between contacts 108 and 109. Hence, a low resistance conducting path is established for low voltages and/or currents which may be transmitted between instruments 101 and 102 through lines 111 and 113. The magnitude of the current circulating through resistor 122, and the contacts of relay 104, is limited by resistor 122 to limit the resistive voltage drop across contacts 108 and 109 due to the circulating current and to prevent damage to contacts 108, 109, or 110.

As switch 117 remains closed, coil 105 continues to be energized, contacts 108, 109, and 110 remain closed, and an alternating current continues to flow in the circular loop from coil 106 through line 120, resistor 122, contacts 110, 109, and 108, and line 119 back to coil 106. This alternating current will generate a small alternating voltage across the effective resistance between contacts 108 and 109. If not counteracted, this alternating voltage will appear across lines 111 and 113 and may effect the operation of instruments 101 and/or 102. In many applications, such as the switching of D.C. signals transmitted between instruments 101 and 102, a small alternating voltage across lines 111 and 113 will be of little consequence. However, in certain other instances such as the switching of A.C. signals, it is desirable to counteract the A.C. voltage generated across contacts 108 and 109. In a particular circuit of the form of FIGURE 4, the resistance of resistor 121 may be equal in magnitude to the resistance of resistor 122, and the resistance of resistor 112 equal in magnitude to the effective resistance between contacts 108 and 109. Under these conditions, current circulating in the series loop from coil 106 through line 120, resistor 121, resistor 112, and line 119 back to coil 106 will generate an alternating voltage across resistor 112 whose magnitude is equal to that of the alternating voltage generated across contacts 108 and 109 by current through resistor 122. The alternating voltage generated across resistor 112, from line 111 to contact 108, will oppose and cancel the alternating voltage generated from contact 108 to contact 109. Hence, the alternating voltage across lines 111 and 113 will be significantly less than the alternating voltage generated across contacts 108 and 109 by current through resistor 122.

When switch 117 is opened, coil 105 is de-energized. As the contacts of relay 104 open, the connection between contacts 109 and 110 is broken first to prevent the current circulating through resistor 122 from directly entering the circuits of instruments 101 and 102. Thereafter, the connection between contacts 108 and 109 is broken, opening the connection between instruments 101 and 102 through lines 111 and 112.

Batteries, transformers, and windings upon the core of a relay have been shown as sources of electrical energy for the circulation of current through switch contacts to establish low resistance connections therethrough. Other electrical energy sources, supplying either alternating or direct current, may also be employed in accordance with the concept of this invention.

Switches and relay contacts have been disclosed as means for controlling or interrupting the flow of currents circulated through switch contacts for the purpose of establishing low resistance connections therethrough. Various alternate forms of current interrupting or controlling means may also be employed for similar purposes.

In the specific forms of the invention illustrated, one or more resistors have been employed to limit the magnitude of the current circulated through switch contacts for the purpose of establishing a low resistance connection therethrough. Other impedances or current limiting or current controlling means may also be employed for similar purposes.

Specific illustrated forms of the invention employing electromagnetic relays have shown only a single set of relay contacts. Additional contact assemblies of a similar or different nature may also be included in the structure of an individual relay. In instances where a coil wound upon the magnetic core of a relay is employed to generate a current which is circulated through the contacts, it is evident that two or more such coils may be similarly wound upon an individual relay core.

The specifically illustrated forms of the invention employing electromagnetic relays have shown normally open contact assemblies, which close upon energizing the relay coil. Normally closed contact assemblies, which close upon de-energizing the relay coil, may also be employed in the invention. Normally open and normally closed contacts may be combined to obtain transfer or other more complex contact assemblies.

What is claimed is:

1. Electric switching means for establishing a low impedance path between first and second elements in an electrical circuit, said switching means including a first switch contact electrically connected to said first element, a second switch contact electrically connected to said second element, a source of electromotive force, a third switch contact, make and break means for first successively bringing said first and second switch contacts into mechanical connection with each other and bringing said third contact into electrical connection with said second contact and secondly successively disconnecting said third contact from said second contact and disengaging said first and second contacts from each other, and means to effectively connect said source of electromotive force between said first and third contacts.

2. The combination as specified in claim 1 wherein said first, second and third contacts are constituted as first, second and third leaves of a leaf switch and wherein said make and break means is effective on said first leaf to first force it against said second leaf and then to force said second leaf against said third leaf.

3. The combination as specified in claim 2 wherein said means effective on said first leaf is constituted as an electromagnetic device, and said means to effectively connect said source of electromotive force between said first and third contacts is also effective to operatively connect said source to said electromagnetic device.

4. Electric switching means for establishing a low impedance current path between first and second elements in an electrical circuit, said switching means including a first switch contact electrically connected to said first element; a second switch contact electrically connected to said second element; a source of unidirectional electromotive force; a third switch contact; a transformer having its secondary connected between said first and third contacts; a current limiting device; an independent switch having first and second terminals; a first end of said source of unidirectional electromotive force being connected to said first terminal of said independent switch, and said current limiting device and a primary of said transformer being connected in series to each other between a second end of said source of electromotive force and said second terminal of said independent switch; means for first successively bringing said first and second switch contacts into mechanical engagement with each other and electrically connecting said third contact to said second contact, and secondly successively disconnecting said second and third contacts from each other and disengaging said first and second contacts from each other.

5. The combination as specified in claim 4 wherein said successively operating means includes an electromagnetic device operative to first force said first switch contact into mechanical engagement with said second switch contact and then to force said second contact into effective electrical connection with said third switch contact, said electromagnetic device being effectively connected between said second terminal of said independent switch and said second end of said source of unidirectional voltage.

6. Electric switching means for establishing a low impedance current path between first and second elements in an electrical circuit, said switching means including a first switch contact electrically connected to said first element; a second switch contact electrically connected to said second element; a source of unidirectional electromotive force; a third switch contact; a transformer having its secondary connected between said first and third contacts; a current limiting device; said current limiting device and a primary of said transformer being connected in series with each other; an independent switch having first and second terminals; a first end of said source of unidirectional electromotive force being connected to said terminal of said independent switch; said current limiting device and transformer primary being connected between said second terminal of the independent switch and a second end of said source of unidirectional electromotive force opposite said first terminal to form a closed series loop from said first terminal of said independent switch to said second terminal thereof; a unidirectional electronic valve connected from said second terminal of said independent switch to said second end of said source of unidirectional electromotive force in direction to oppose current flow through said valve, said source of unidirectional electromotive force and said independent switch when said switch is closed; means for first successively bringing said first and second switch contacts into mechanical engagement with each other and electrically connecting said third contact to said second contact, and secondly successively disconnecting said second and third contacts from each other and disengaging said first and second contacts from each other.

7. Electric switching means for establishing a low impedance current path between first and second elements in an electrical circuit, said switching means including a first switch contact electrically connected to said first element, a second switch contact electrically connected to said second element, a source of electromotive force, a third switch contact, means for effectively connecting said source of electromotive force between said first and said third contacts, and means for first successively bringing said first and second switch contacts into mechanical engagement with each other and electrically connecting said third contact to said second contact, and secondly successively electrically disconnecting said third contact from said second contact, and disengaging said first and second contacts from each other.

References Cited in the file of this patent

UNITED STATES PATENTS

| | | |
|---|---|---|
| 1,785,818 | Peterson et al. | Dec. 23, 1930 |
| 2,183,838 | Hornickel | Dec. 19, 1939 |
| 2,647,165 | Buchner | July 28, 1953 |
| 2,860,262 | Sperr | Nov. 11, 1958 |
| 3,029,351 | Akmenkalins | Apr. 10, 1962 |